US012044037B2

(12) United States Patent
Xiang

(10) Patent No.: US 12,044,037 B2
(45) Date of Patent: Jul. 23, 2024

(54) LOCK AND LOCKING DEVICE

(71) Applicant: Dezhao Xiang, Guangdong (CN)

(72) Inventor: Dezhao Xiang, Guangdong (CN)

( * ) Notice: Subject to any disclaimer, the term of this patent is extended or adjusted under 35 U.S.C. 154(b) by 0 days.

(21) Appl. No.: 18/233,336

(22) Filed: Aug. 14, 2023

(65) Prior Publication Data

US 2023/0383572 A1 Nov. 30, 2023

Related U.S. Application Data

(63) Continuation of application No. PCT/CN2023/095388, filed on May 19, 2023.

(30) Foreign Application Priority Data

May 19, 2022 (WO) ................ PCT/CN2022/093915

(51) Int. Cl.
*E05B 27/00* (2006.01)
*E05B 1/00* (2006.01)
*E05B 15/00* (2006.01)

(52) U.S. Cl.
CPC ........ *E05B 27/0003* (2013.01); *E05B 1/0007* (2013.01); *E05B 15/00* (2013.01)

(58) Field of Classification Search
CPC ...... E05B 27/00; E05B 27/0003; E05B 15/00; E05B 1/0007; Y10T 70/7638; Y10T 70/7644
USPC .................................................... 70/367, 368
See application file for complete search history.

(56) References Cited

U.S. PATENT DOCUMENTS 7,963,134 B2 * 6/2011 Rafferty .................. E05B 13/00 192/84.92
8,141,400 B2 * 3/2012 Sorensen .............. E05B 47/068 70/277
10,626,634 B2 * 4/2020 Verderaime ........... E05B 1/0007
2022/0186526 A1 * 6/2022 Xiang ................. E05B 63/0056
(Continued)

FOREIGN PATENT DOCUMENTS

AU 2010219422 A1 * 4/2011 ........... E05B 1/0007
CN 109113425 A 1/2019
(Continued)

OTHER PUBLICATIONS

International Search Report dated Dec. 20, 2022 for corresponding PCT Application No. PCT/CN2022/093915 along its English Translation.

*Primary Examiner* — Suzanne L Barrett

(57) ABSTRACT

A lock includes a lock housing, a cylinder assembly rotatably arranged in the lock housing and a locking keyless assembly connected to the cylinder assembly in a transmission way. The cylinder assembly includes a cylinder core and a tailpiece unit, a first clutch mechanism is provided between the cylinder core and the tailpiece unit, and a second clutch mechanism is provided between the locking keyless assembly and the tailpiece unit. When the second clutch mechanism is engaged, the locking keyless assembly is movable relative to the lock housing in a first direction under a driving of an external force for locking, and the cylinder core and the tailpiece unit rotate along with the locking keyless assembly. When the external force on the locking keyless assembly is withdrawn, the locking keyless assembly moves in an opposite second direction opposite, so that the second clutch mechanism switches to a disengaged state.

20 Claims, 14 Drawing Sheets

(56) References Cited

U.S. PATENT DOCUMENTS

| | | | | |
|---|---|---|---|---|
| 2022/0381057 | A1* | 12/2022 | Xiang | E05B 55/005 |
| 2023/0127226 | A1* | 4/2023 | Gireesha | E05B 13/005<br>70/107 |

FOREIGN PATENT DOCUMENTS

| | | | | | |
|---|---|---|---|---|---|
| CN | 112252851 | A | | 1/2021 | |
| CN | 112252852 | A | | 1/2021 | |
| CN | 112258710 | A | | 1/2021 | |
| CN | 213927882 | U | | 8/2021 | |
| JP | 2022107574 | A | * | 7/2022 | E05B 47/0012 |
| WO | WO-2020062172 | A1 | * | 4/2020 | |
| WO | WO-2022099618 | A1 | * | 5/2022 | |

* cited by examiner

LOCK AND LOCKING DEVICE

CROSS-REFERENCE TO RELATED APPLICATIONS

The present application is a continuation application of PCT Application No. PCT/CN2023/095388, filed May 19, 2023, which claims priority to PCT Application No. PCT/CN2022/093915, filed on May 19, 2022, the entire contents of which are hereby incorporated by reference.

TECHNICAL FIELD

The present application relates to the technical field of locks, in particular to a lock and a locking device that can achieve keyless locking.

BACKGROUND

Locks are widely used in our daily lives and work, effectively protecting our property. However, the locks in the prior art require the use of a key for both locking and unlocking, which to some extent makes it inconvenient for users.

How to achieve keyless locking of the existing locks has become an urgent technical problem to be solved.

SUMMARY

In view of the shortcomings of the prior art, the present application provides a lock and a locking device that can achieve keyless locking.

On one aspect, the present application provides a lock including a lock housing, a cylinder assembly being rotatably arranged in the lock housing and a locking keyless assembly being connected to the cylinder assembly in a in transmission way, the cylinder assembly including a cylinder core and a tailpiece unit, a first clutch mechanism being provided between the cylinder core and the tailpiece unit, and a second clutch mechanism being provided between the locking keyless assembly and the tailpiece unit. When the second clutch mechanism is in an engaged state, the locking keyless assembly is movable relative to the lock housing in a first direction under a driving of an external force for locking, the cylinder core and the tailpiece unit rotate along with the locking keyless assembly synchronously; when the external force acting on the locking keyless assembly is withdrawn, the locking keyless assembly moves in a second direction opposite to the first direction, so that the second clutch mechanism switches to a disengaged state.

On another aspect, the present application provides a locking device that includes a first object and a second object, wherein the first object is provided with the above lock, the lock is locked with the second object when it is in a locked state and separated from the second object when it is in an unlocked state.

Compared with the prior art, the lock provided by the present application can achieve key locking and keyless locking by means of the first clutch mechanism and the second clutch mechanism, making it more convenient to use.

FIG. **9*a*** is a schematic view of the first and second clutch mechanisms, wherein the lock is in a locked status by the knob but the knob hasn't been reset.

FIG. **9*b*** is a schematic view of the first and second clutch mechanisms, wherein the lock is in a locked status by the knob and the knob has been reset.

FIG. **9*c*** is a schematic view of the first clutch mechanism being engaged by inserting of a key.

FIG. **9*d*** is a schematic view of the lock being unlocked by inserting of a key.

FIG. **9*e*** is a schematic view of the lock that rotates clockwise for locking, which is in the unlocked state.

FIG. **9*f*** is a schematic view of the lock that rotates clockwise for locking, which is in the locked state.

Figure 10:
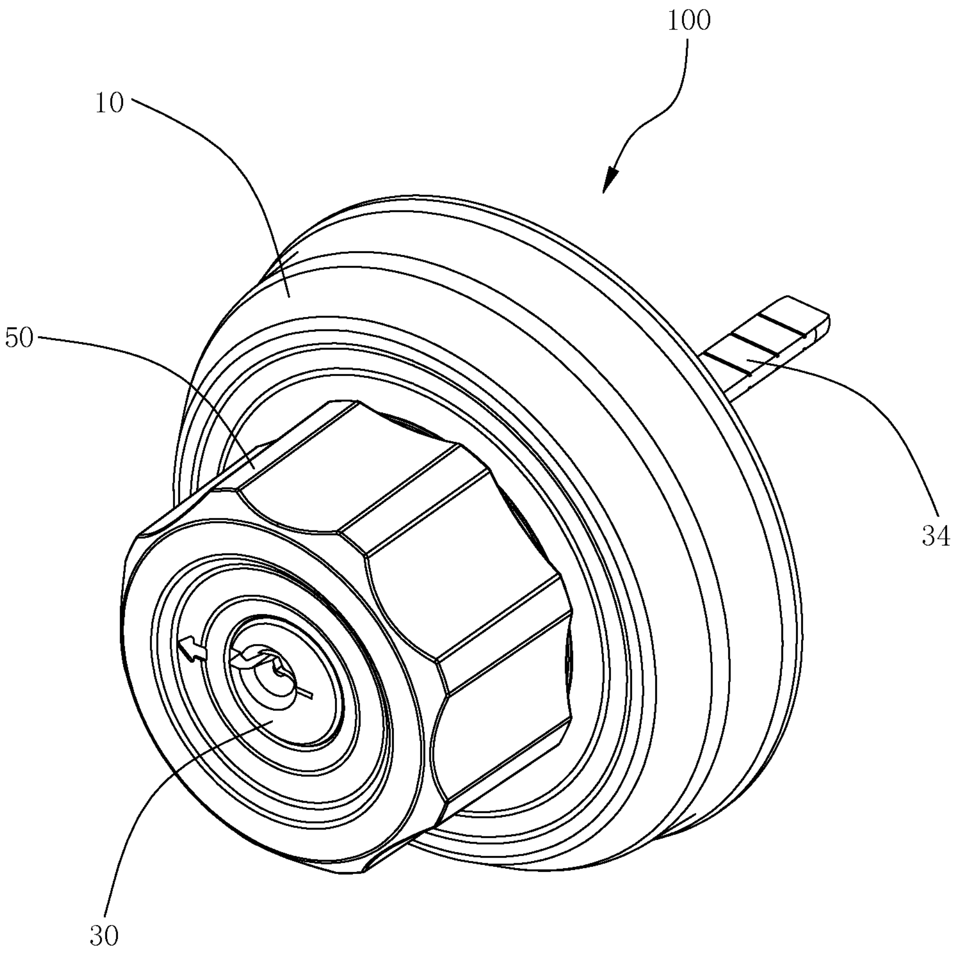

FIG. 10 is a schematic view of a lock according to a second embodiment of the present application.

FIG. **10*a* is a schematic view of a tailpiece unit of the lock shown in FIG. 10**.

Figure 11:
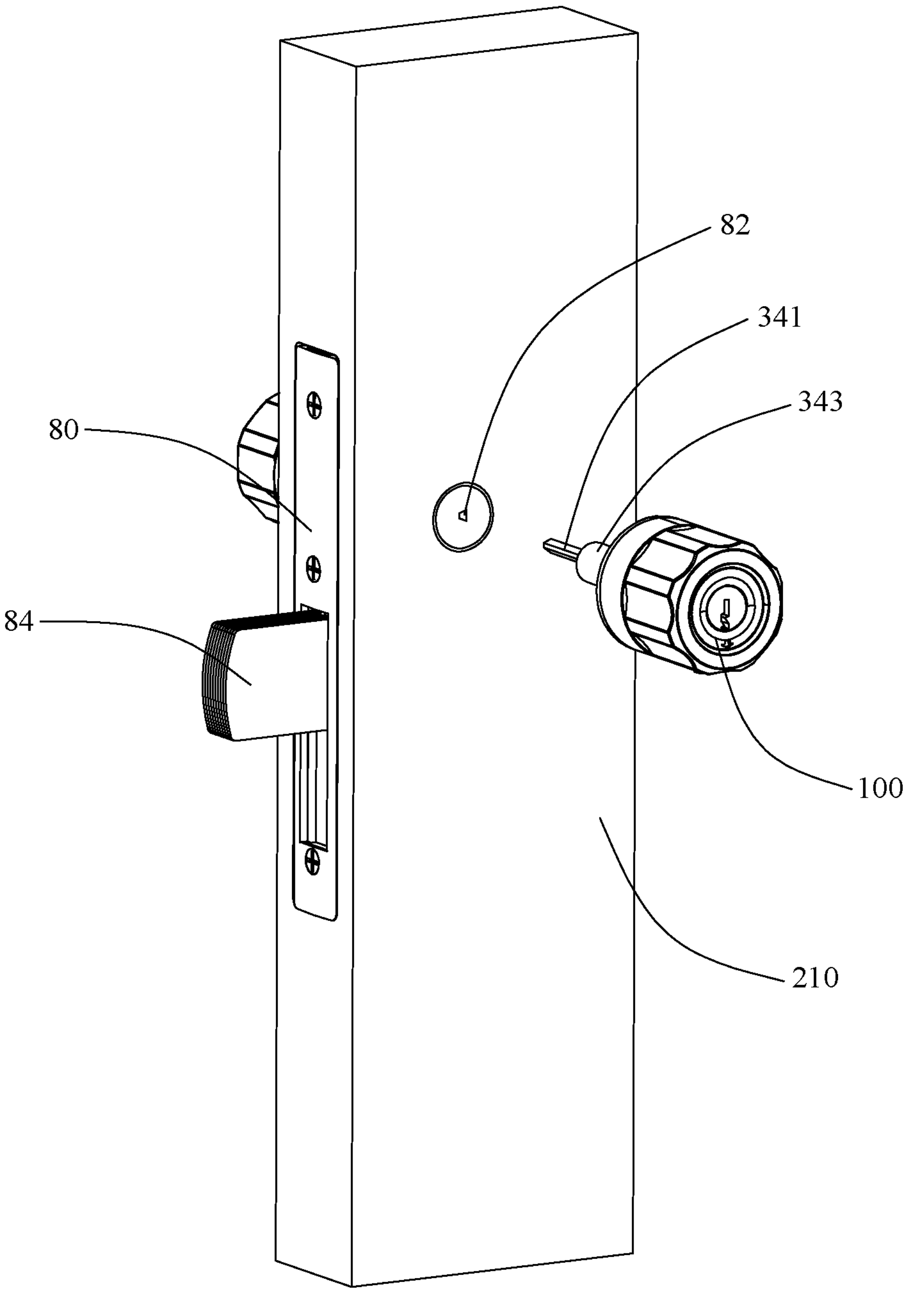

FIG. 11 is a schematic view of a lock according to a third embodiment of the present application.

Figure 12:
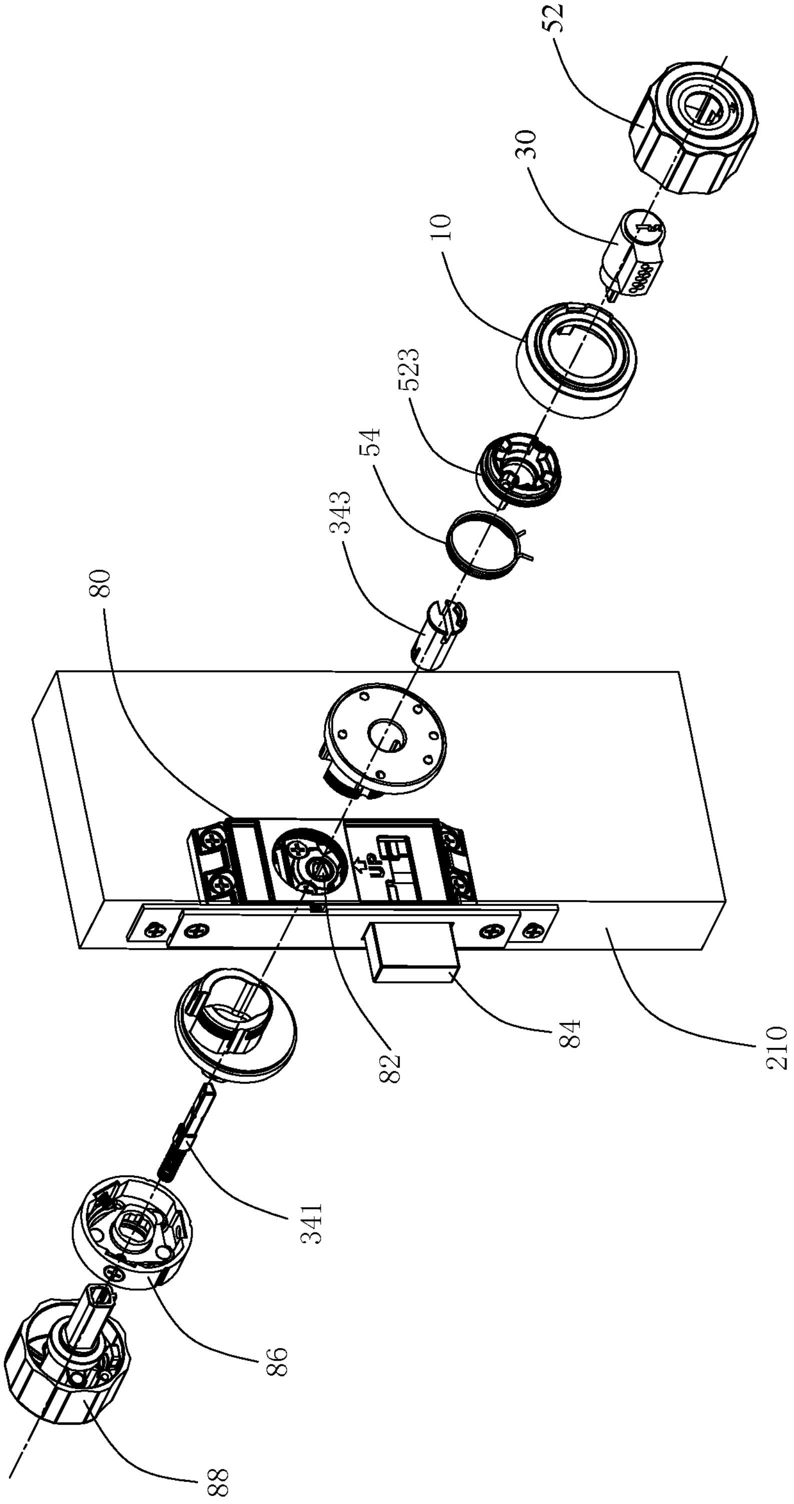

FIG. 12 is a schematic view of a lock according to a fourth embodiment of the present application.

IN THE DRAWINGS lock 100
lock housing 10
mounting seat 12
step 121
sleeve 14
bearing 16
gasket 18
thread 19
cylinder assembly 30
cylinder core 32
keyway 321
tailpiece unit 34
tailpiece 341
first transmission portion 343
first connecting hole 345
second connecting hole 347
locking member 36
first clutch mechanism 40
first driving portion 42
first clutch portion 44
arc-shaped groove 441
first driving face C1
second driving face D1
first clutch face C2
second clutch face D2
locking keyless assembly 50
operating member 52 reset member 54
cylinder shell 56
latching portion 58
position portion 59
knob 521
second transmission member 523
connecting pole 525
fixing hole 527
through hole 529
second clutch mechanism 60
second driving portion 62
second clutch portion 64
third driving face A1
fourth driving face B1
third clutch face A2
the fourth clutch face B2

DESCRIPTION OF THE EMBODIMENTS

For better understanding the present application, a more detailed description of the present application will be given below with reference to the append drawings. The append drawings exemplify one or more embodiments of the present application to make the understanding of the disclosed technical solutions more accurate and thorough. However, it should be understood that the present application can be implemented in various forms, not limited to the embodiments described below.

The same or similar labels in the append drawings of the present application correspond to the same or similar components. In the description of the present application, it should be understood that terms such as "up", "down", "left", "right" indicating an oriental or positional relationship based on the oriental or positional relationship shown in the append drawings, which is only intended to facilitate the description of the present application and simplify the description, not to indicate or imply that the apparatus or component referred must have a specific orientation, is constructed and operated in a specific orientation. Therefore, the terms describing the position relationship in the append drawings are only for illustrative purposes, and cannot be understood as a limitation to the present application. For those ordinary skilled in the art, the specific meanings of the above terms may be understood according to specific circumstances.

In addition, descriptions related to "first", "second" and the like in the embodiments of the present application are only used for descriptive purposes and cannot be understood as indicating or implying their relative importance or implicitly indicating the number of technical features indicated. Therefore, a feature limited to "first" and "second" may explicitly or implicitly includes at least one of this feature. In addition, "and/or" in the whole specification means that includes three parallel schemes. Taking "A and/or B" as an example, it includes scheme A, scheme B, or scheme that including both A and B.

In addition, technical solutions of various embodiments may be combined with each other, but must be based on what those ordinary skilled in the art can achieve. When the combination of technical solutions conflicts or cannot be achieved, it should be considered that the combination of such technical solutions does not exist and is not within the scope of the present application.

Figure 1:
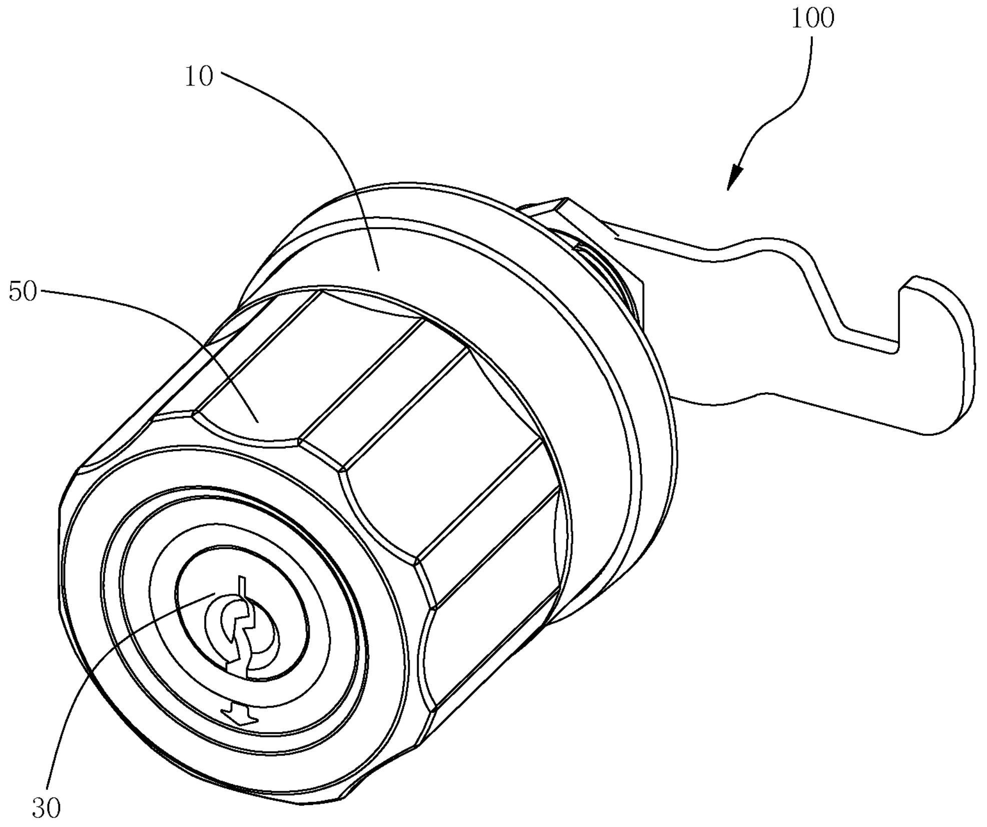
FIG. 1 is a schematic view of a lock according to the present application.

The present application provides a lock, and a specific embodiment of the lock 100 is shown in FIG. 1, which includes a lock housing 10, a cylinder assembly 30 arranged in the lock housing 10 and a locking keyless assembly 50 connected to the cylinder assembly 30 in a transmission way.

Figure 2:
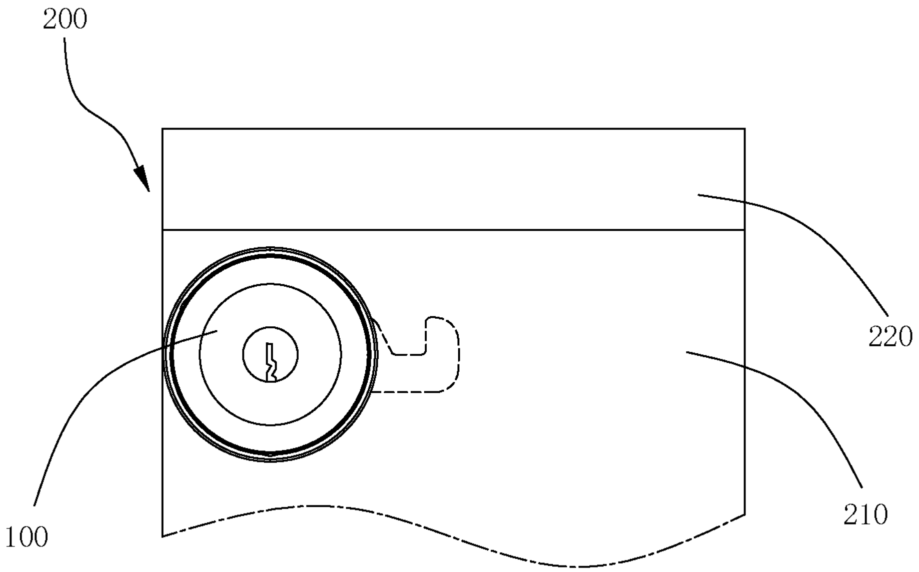
FIG. 2 is a schematic view of a locking device according to the present application, wherein the locking device is in an unlocked state.
Figure 3:
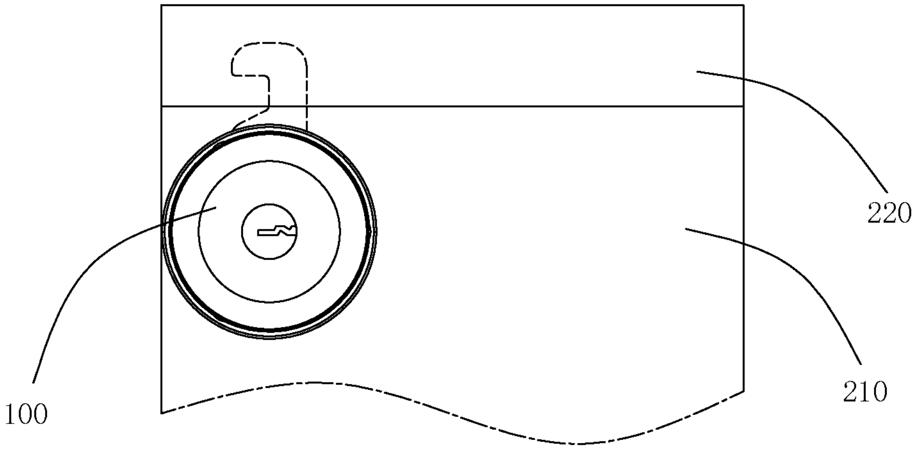
FIG. 3 a schematic view of the locking device in a locked state.

The present application further provides a locking device, and a specific embodiment of the locking device is shown in FIG. 2 and FIG. 3, which includes a first object 210, a second object 220 and the lock 100. The lock 100 is mounted on the first object 210, and cooperates with the second object 220 to enable the two objects 210 and 220 to be locked together or separated from each other. Specifically, the lock 100 has an unlocked state and a locked state. In the locked state, as shown in FIG. 3, the first object 210 on which the lock 100 is mounted is locked with the second object 220. For example, when the lock 100 is mounted onto a door/window, the door/window can be locked to a door frame/window frame, thereby creating a private space. For another example, when the lock 100 is mounted onto the cabinet door, the cabinet door can be locked to a cabinet body, thereby creating a safe space for storing valuable items, confidential documents, etc. In the unlocked state, as shown in FIG. 2, the first object 210 on which the lock 100 is mounted can be opened relative to the second object 220, such as opening the door or window for ventilation, opening a drawer for storing or picking up files, etc.

Figure 4:
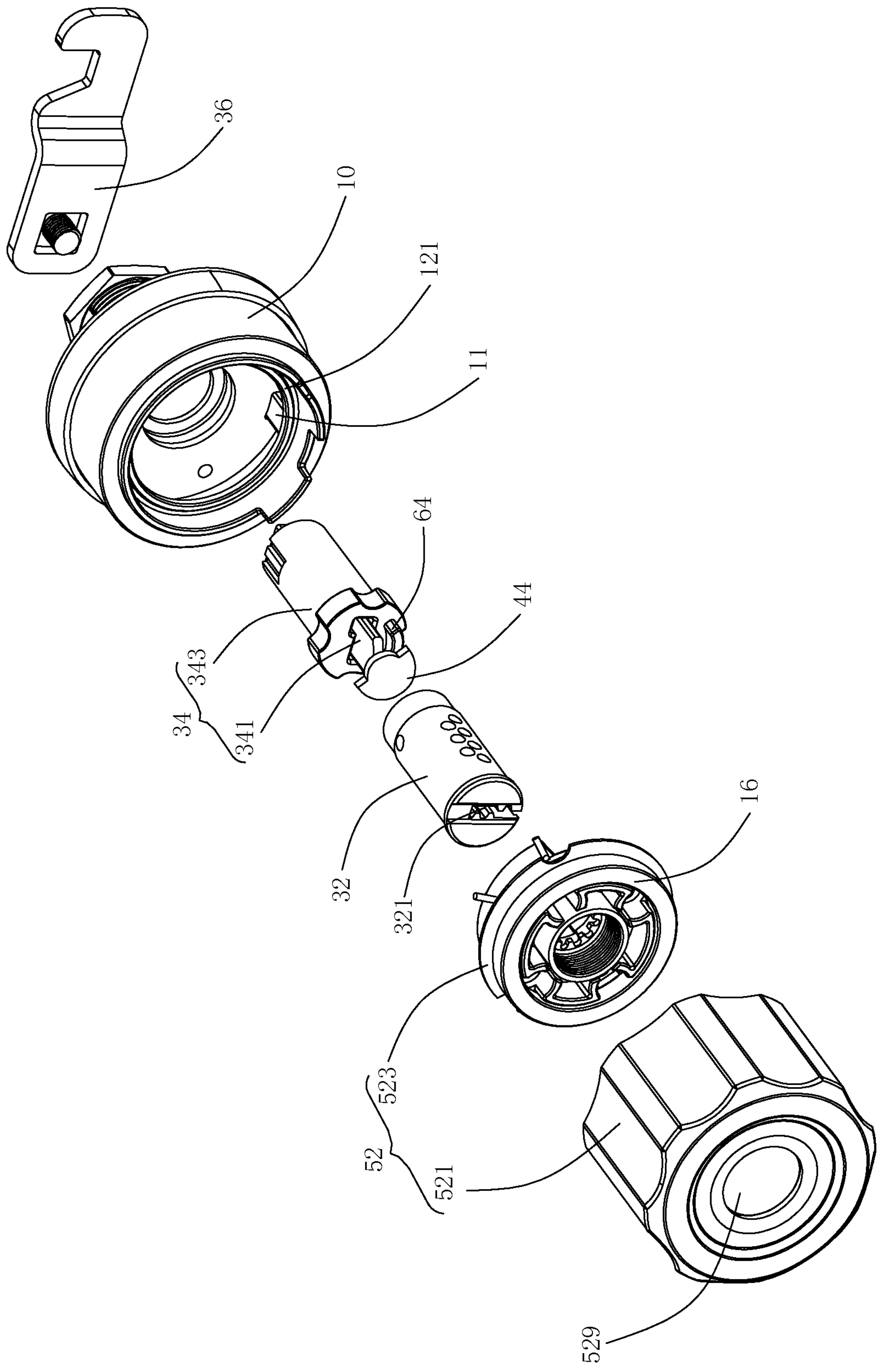
FIG. 4 is an exploded view of the lock shown in FIG. 1.
Figure 5:
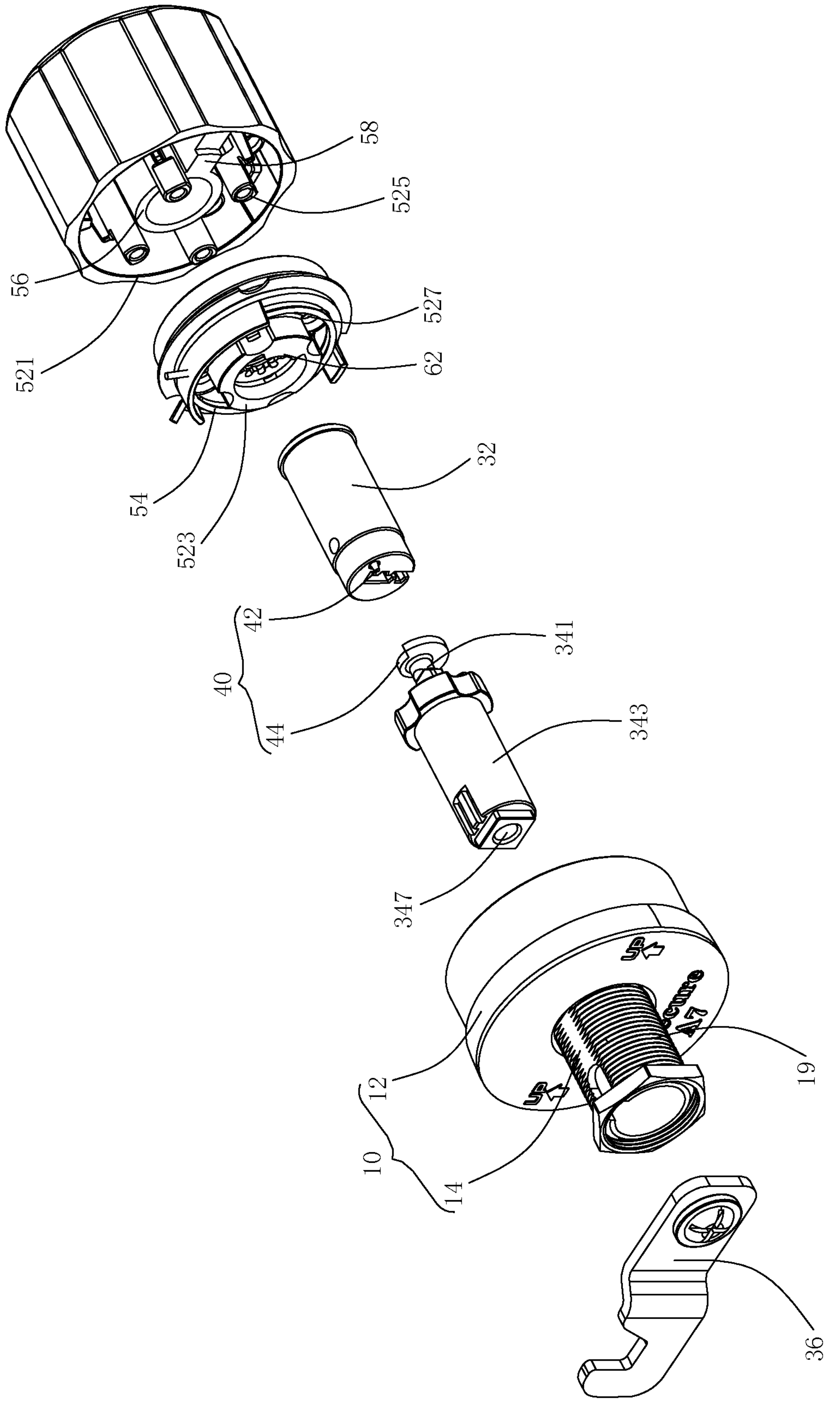
FIG. 5 shows an exploded view of the lock from another perspective.
Figure 6:
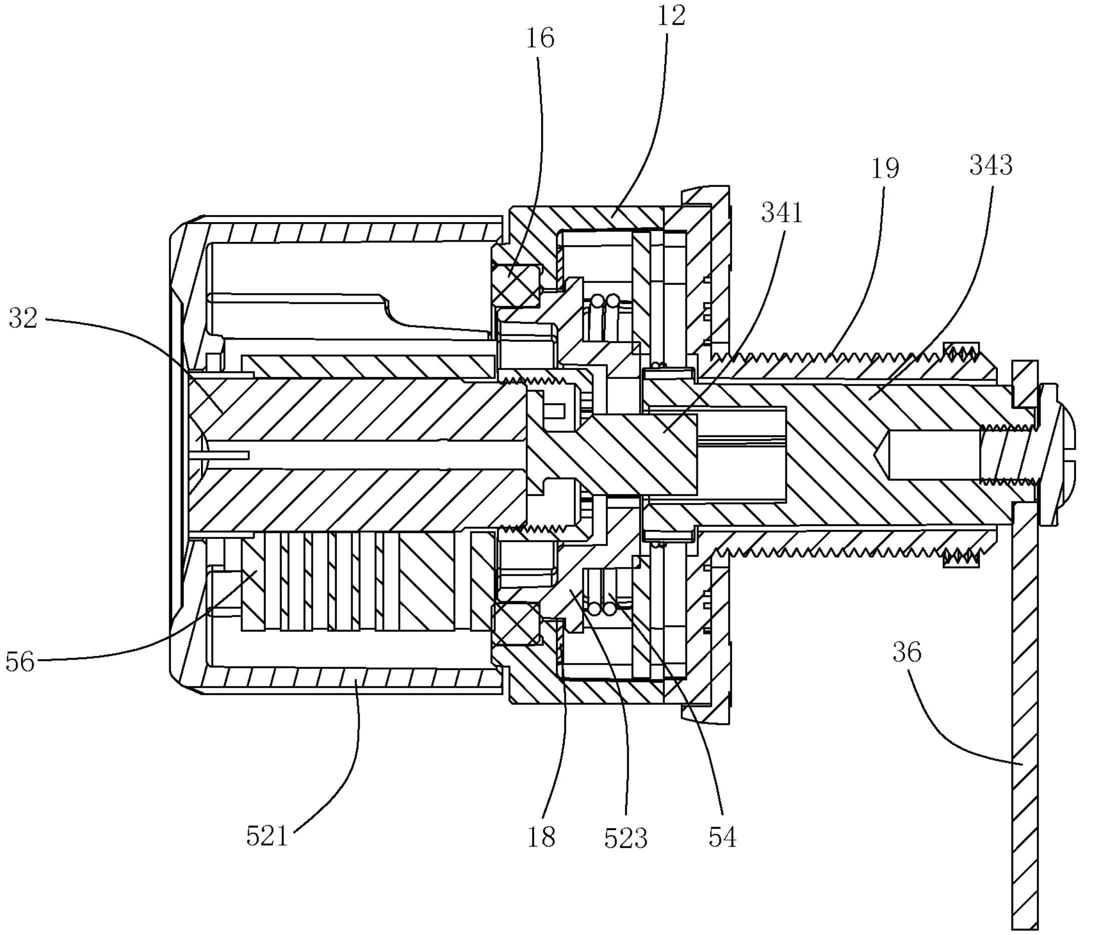
FIG. 6 is a cross-sectional view of the lock.

Please also referring to FIGS. 4-6, the cylinder assembly 30 acts as a basic part of the lock 100, can cooperate with a key (not shown) for locking and unlocking of the lock 100. In this embodiment, the cylinder assembly 30 includes a cylinder core 32, a tailpiece unit 34 and a locking member 36. Specifically, the cylinder core 32 as a whole is column-shaped, and is rotatably arranged in the lock housing 10. A keyway 321 is defined in a central portion of the cylinder core 32 for inserting of a matching key therein. After the key is inserted into the keyway 321, forcefully rotating the key can drive the cylinder core 32 to rotate. The tailpiece unit 34 is arranged at an inner end of the cylinder core 32 along an axial direction, and drives the locking member 36 to rotate to a locked position or an unlocked position under the driving of the cylinder core 32, in turn driving a locking body, a locking bolt and the like connected to the locking member 36 to move back and forth, thereby achieving locking and unlocking of the lock 100. The locking member 36 may be formed separately and then assembled to the tailpiece unit 34, or may be integrally formed with the tailpiece unit 34. In the illustrated embodiment, the locking member 36 is a locking hook. According to different orientations of the locking hook of the locking member 36, the locking member 36 has different rotation directions during the locking operation.

Figure 7:
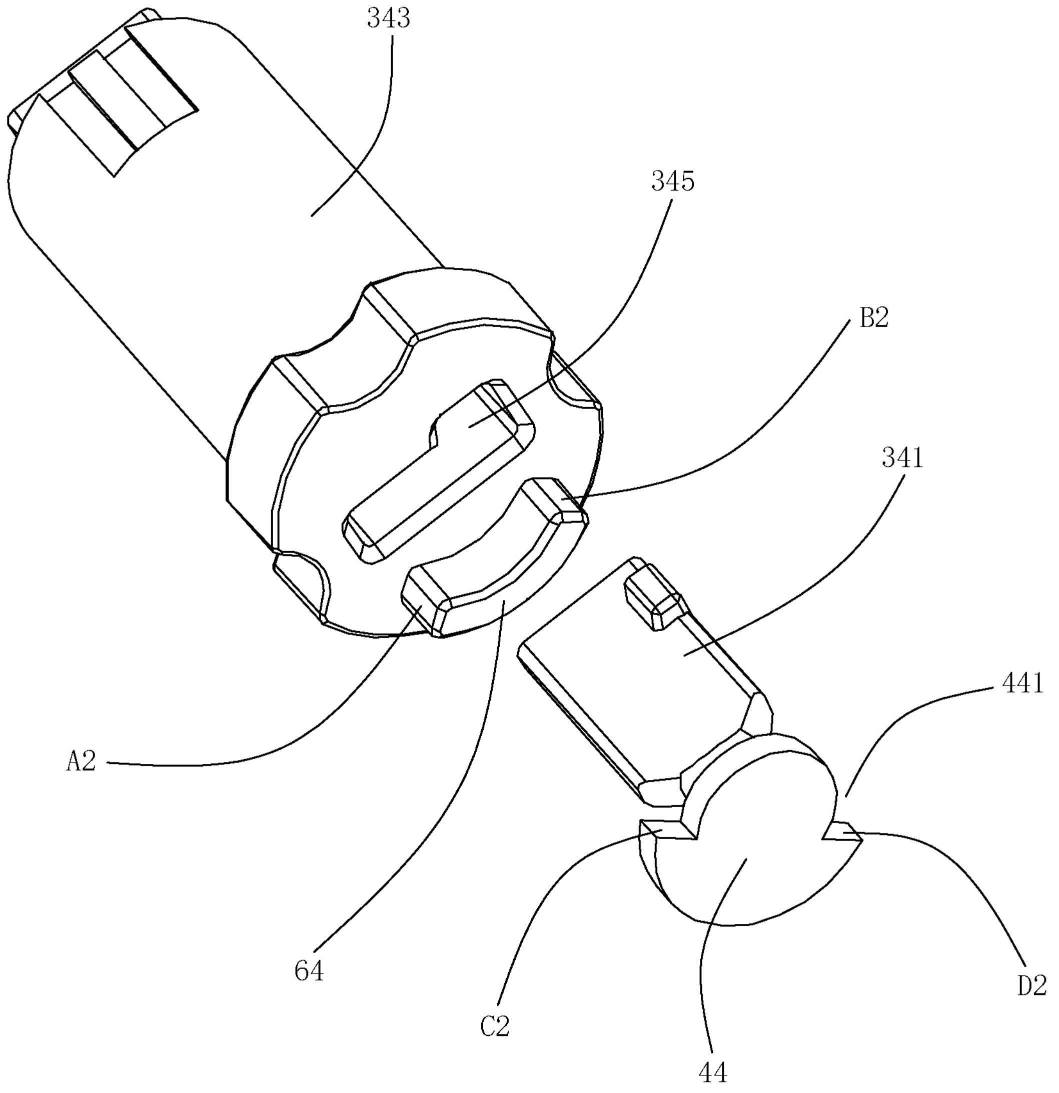
FIG. 7 is a further exploded view of a tailpiece unit of the lock.

Please also referring to FIG. 7, a first clutch mechanism 40 is provided between the cylinder core 32 and the tailpiece unit 34. The first clutch mechanism 40 includes a first driving portion 42 and a first clutch portion 44 cooperating with each other. In this embodiment, the first driving portion 42 is provided at an end of the cylinder core 32 facing towards the tailpiece unit 34, and the first clutch portion 44 is provided at an end of the tailpiece unit 34 facing towards the cylinder core 32. The first driving portion 42 includes opposite first driving face C1 and second driving face D1. The first clutch portion 44 defines an arc-shaped groove 441, and a first clutch face C2 and a second clutch face D2 are formed at two circumferential sides of the arc-shaped groove 441 of the first clutch portion 44, respectively. Preferably, the first driving portion 42 is a driving pin that extends into the arc-shaped groove 441 of the first clutch portion 44, with the first driving face C1 corresponding to the first clutch face C2 and the second driving face D1 corresponding to the second clutch face D2. The first driving portion 42 can rotate relative to the first clutch portion 44 in the arc-shaped groove 441, making the first driving face C1 abut or separate from the first clutch face C2, and the second driving face D1 abut or separate from the second clutch face D2.

When the first driving face C1 and the first clutch face C2 of the first driving portion 42 abut each other, the first clutch mechanism 40 is in a first engaged state, and the cylinder core 32 can drive the tailpiece unit 34 to rotate in a first direction (such as counterclockwise direction). When the second driving face D1 and the second clutch face D2 abut each other, the first clutch mechanism 40 is in a second engagement state, and the cylinder core 32 can drive the tailpiece unit 34 to rotate in a second direction (such as clockwise direction). When the first driving face C1 is separated from the first clutch face C2 and the second driving face D1 is separated from the second clutch face D2, the first clutch mechanism 40 is in a disengaged state, and the tailpiece unit 34 remains stationary during rotation of the cylinder core 32, that is, the cylinder core 32 is idling. Preferably, a central angle corresponding to a space (i.e., the arc-shaped groove 441) between the first clutch face C2 and the second clutch face D2 is about 180 degrees. The present application provides the first clutch mechanism 40 between the cylinder core 32 and the tailpiece unit 34, so that the cylinder core 32 and the tailpiece unit 34 have two states of engaged and disengaged. Only in the engaged state, the cylinder core 32 can drive the tailpiece unit 34 to rotate for locking or unlocking.

In some embodiments, the first driving portion 42 may be formed separately and then assembled to the cylinder core 32, or may be integrally formed with the cylinder core 32. The first clutch portion 44 may be formed separately and then assembled to the tailpiece unit 34, or may be integrally formed with the tailpiece unit 34.

Figure 8:
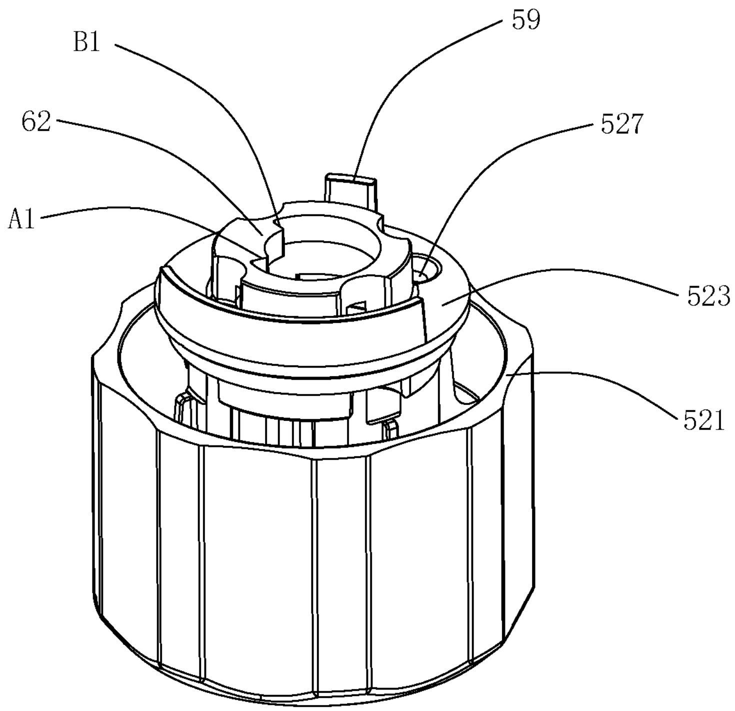
FIG. 8 is a schematic view of a knob of a locking keyless assembly of the lock.

Please also referring to FIG. 8, the locking keyless assembly 50 is configured for keyless locking of the lock 100, that is, locking the lock 100 without inserting a key into the cylinder core 32. The locking keyless assembly 50 includes an operating member 52 and a reset member 54, wherein the operating member 52 may be a knob and the like, and the reset member 54 may be a coil spring, torsion spring, etc.

A second clutch mechanism 60 is provided between the operating member 52 and the tailpiece unit 34, and includes a second driving portion 62 and a second clutch portion 64 cooperating with each other. The second driving portion 62 is connected to the locking keyless assembly 50, and the second clutch portion 64 is connected to the tailpiece unit 34. By means of the second clutch mechanism 60, the locking keyless assembly 50 and the tailpiece unit 34 have two states of disengaged and engaged. In the engaged state, rotation of the operating member 52 can drive the tailpiece unit 34 and the locking member 36 to rotate for locking. In this way, when the lock 100 of the present application is in use, locking can be achieved by rotation of the cylinder core 32, the tailpiece unit 34 and the locking member 36 driven by the key, or by rotation of the tailpiece unit 34 and the locking member 36 driven by the operating member 52, that is, keyless locking is achieved, improving the convenience of operation.

The second driving portion 62 is an arc-shaped block, and a third driving face A1 and a fourth driving face B1 are formed at two circumferential sides thereof. The second clutch portion 64 is also an arc-shaped block, and a third clutch face A2 and a fourth clutch face B2 are formed at two circumferential sides thereof. The second driving portion 62 and the second clutch portion 64 are coaxial and have the same size, that is, are located on a same ring. The third driving face A1 and the third clutch face A2 face towards each other, and the fourth driving face B1 and the fourth clutch face B2 face towards each other. When the operating member 52 rotates, it can make the third driving face A1 abut or separate from the third clutch face A2, or make the fourth driving face B1 abut or separate from the fourth clutch face B2. Preferably, a central angle corresponding to a circumferential length of the second driving portion 62 or the second clutch portion 64 is about 90 degrees.

One end of the reset member 54 is connected to the operating member 52, and another end of the reset member 54 is connected to a fixed member, such as the lock housing 10. When the operating member 52 rotates relative to the lock housing 10 under an action of an external force, the reset member 54 is compressed or stretched. When the external force applied on the operating member 52 is withdrawn, the reset member 54 restores deformation and pushes the operating member 52 to rotate in an opposite direction for reset. Preferably, two position portions 59 are provided on the operating member 52 and the lock housing 10, respectively, and abut against two ends of the reset member 54 or connected to the two ends of the reset member 54 by plugging, respectively. When the operating member 52 rotates relative to the lock housing 10, one end of the reset member 54 abutting the operating member 52 rotates along with the rotary lock housing 10, resulting in deformation and generating a reset elastic force that causes the operating member 52 to reset in an opposite direction.

The cylinder core 32 is arranged in the operating member 52, and is preferably frictionally matched with the operating member 52, so that the cylinder core 32 can be fixed in the operating member 52 to rotate along with the operating member 52 synchronously when there is no external force applied thereon, and rotate relative to the cylinder core 32 when the external force (such as twisting the key) is applied thereon. Preferably, a cylinder shell 56 is provided at a central portion of the operating member 52 for mounting the cylinder core 32, and an outer end face of the operating member 52 is provided with a through hole 529 at a position corresponding to the cylinder shell 56, so that the keyway 321 of the cylinder core 32 can be exposed. Slidable latching pins may be provided on the cylinder core 32 and/or cylinder shell 56 with lengths designed corresponding to a tooth shape of the key. By inserting the key, the latching pins slide to unlock, enabling the locking cylinder 32 to rotate relative to the cylinder shell 56.

Figure 9:
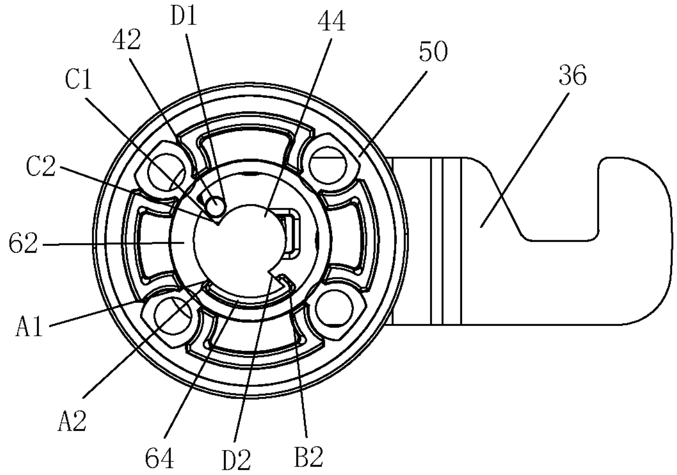
FIG. 9 is a schematic view of first and second clutch mechanisms of the lock in an unlocked state.

Taking counterclockwise rotation for locking and clockwise rotation for unlocking as an example, an operation process of the lock 100 of the present application is described as below:

In an embodiment, as shown in FIG. 9, the lock 100 is in the unlocked state initially, the first clutch mechanism 40 is in the engaged state, and the second clutch mechanism 60 is in the engaged state. Specifically, the first driving face C1 of the first driving portion 42 abuts the first clutch face C2 of the first clutch portion 44; and the second driving face D1 is away from the second clutch face D2 with a central angle corresponding to a space therebetween is about 180 degrees, i.e., half a circle. The third driving face A1 of the second driving portion 62 abuts the third clutch face A2 of the second clutch portion 64; and the fourth driving face B1 is away from the fourth clutch face B2 with a central angle corresponding to a space therebetween is about 180 degrees, i.e., half a circle.

Figure 9A:
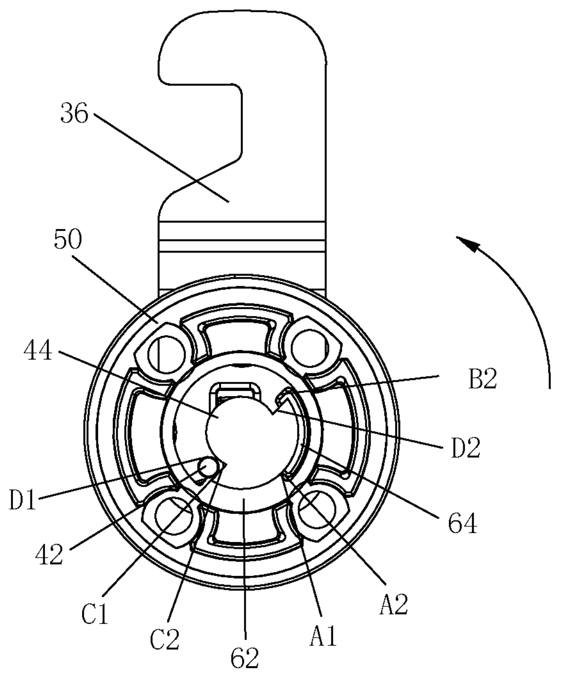

Under the unlocked state, the operating member 52 is rotated for locking, as shown in FIG. 9*a*, a force is applied to rotate the operating member 52 counterclockwise for a certain angle (such as 90 degrees), and the cylinder core 32 inside the operating member 52 rotates along with the operating member 52 synchronously. Due to the abutment between the third driving face A1 and the third clutch face A2 of the second clutch mechanism 60, rotation of the operating member 52 will push the tailpiece unit 34 and the locking member 36 to rotate along therewith counterclockwise for a certain angle to reach the locked position. In this situation, the locking member 36 is locked with the second object 220, and the lock 100 is in the locked state. During this process, the operating member 52, the cylinder core 32, the tailpiece unit 34 and the locking member 36 rotate synchronously, and the first clutch mechanism 40 and the second clutch mechanism 60 remain in the engaged state. However, due to the rotation of the operating member 52, the reset member 54 is compressed or stretched to generate elastic deformation.

Figure 9B:
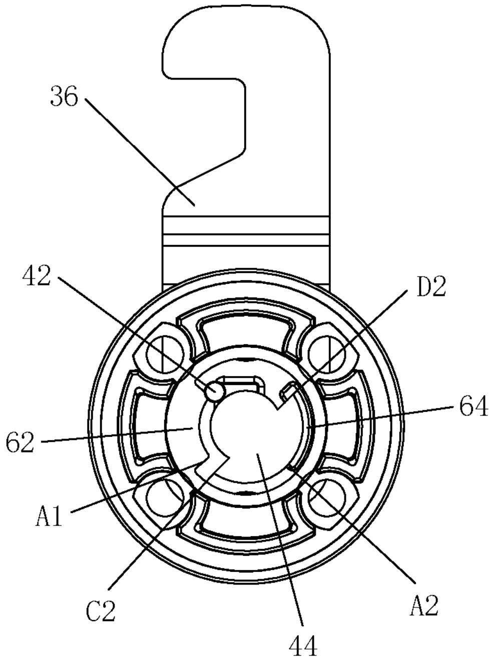

After the lock 100 is locked by the operating member 52, the operating member 52 is released. As shown in FIG. 9*b*, the reset member 54 restores deformation and pushes the operating member 52 to rotate reversely (i.e. clockwise) to reset, causing the third driving face A1 to separate from the third clutch face A2, thereby the second clutch mechanism 60 switching to the disengaged state. In this situation, a central angle corresponding to a space between the third driving face A1 and the third clutch face A2 is about 90 degrees. During the automatic reset process of the operating member 52, the cylinder core 32 rotates reversely along with the operating member 52 to reset, the locking gauge unit 34 and the locking member 36 remain stationary, the locking gauge unit 34 and the cylinder core 32 generate relative rotation, and the first driving face C1 is separated from the first clutch face C2. In this situation, a central angle corresponding to the a between the first driving face C1 and the first clutch face C2 is greater than 90 degrees, and the first clutch mechanism 40 switches to the disengaged state.

Figure 9C:
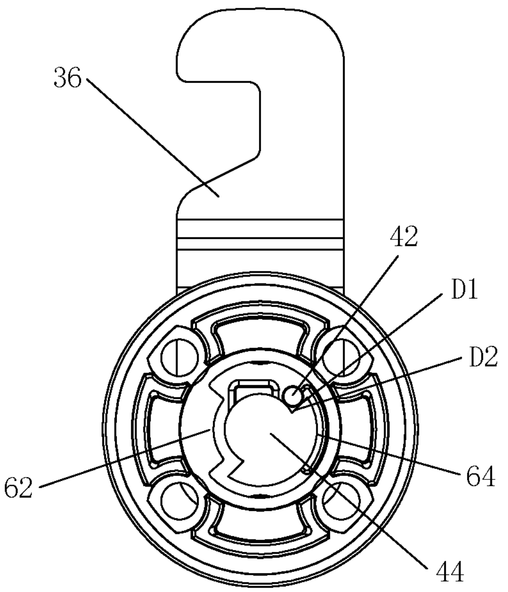
Figure 9D:
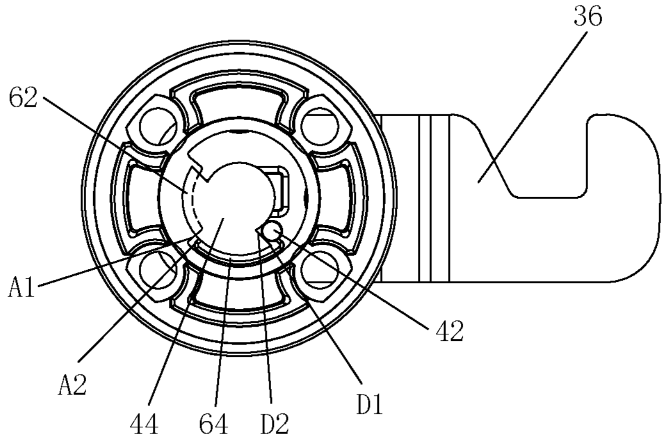

When the lock 100 needs to be unlocked, as shown in FIG. 9*c*, the key is inserted into the keyway 321 of the lock 32. Firstly, the key drives the lock 32 to rotate a first angle (such as 90 degrees) in the second direction (i.e. clockwise direction), so that the second driving face D1 of the first driving portion 42 contacts the second clutch face D2 of the first clutch portion 44, thereby the first clutch mechanism 40 switching to the engagement state. Then, as shown in FIG. 9*d*, the key rotates continuously in the second direction for a second angle (such as 90 degrees), so that the cylinder core 32 drives the tailpiece unit 34 and the locking member 36 to rotate synchronously to reach the unlocked position. During this process, the operating member 52 remains stationary, the tailpiece unit 34 and the locking member 36 rotate about 90 degrees relative to the operating member 52, the third driving face A1 returns to the position where it contacts the third clutch face A2, and the second clutch mechanism 60 returns to the engaged state.

After the lock 100 is unlocked, the key can be taken off. Before removing the key, the key is rotated in the first direction, i.e., counterclockwise, for an angle that is a sum of the first angle and the second angle, which is 180 degrees in this embodiment. The cylinder core 32 rotates along with the key, causing the first driving portion 42 to move away from the second clutch face D2 and return to a state that the first drive surface C1 abuts the first clutch face C2, thereby the first clutch mechanism 40 returning to the engaged state. During this process, the operating member 52, the tailpiece unit 34 and the locking member 36 remain stationary, and the third driving face A1 remains in contact with the third clutch face A2, that is the second clutch mechanism 60 remaining in the engaged state, and the lock 100 in whole returning to the initial state as shown in FIG. 9.

It should be understood that the lock 100 in the unlocked state may also be locked by the key. In this situation, the key is inserted into the keyway 321 of the cylinder core 32 and rotated counterclockwise, causing the first driving face C1 of the first driving portion 42 to push the first clutch face C2 of the first clutch portion 44 to rotate, in turn driving the tailpiece unit 34 and the locking member 36 to rotate counterclockwise to the locked position. During this process, the operating member 52 remains stationary, the locking unit 34 rotates relative to the operating member 52, and the third driving face A1 separates from the third clutch face A2, thereby the second clutch mechanism 60 switching to the disengaged state.

Figure 9E:
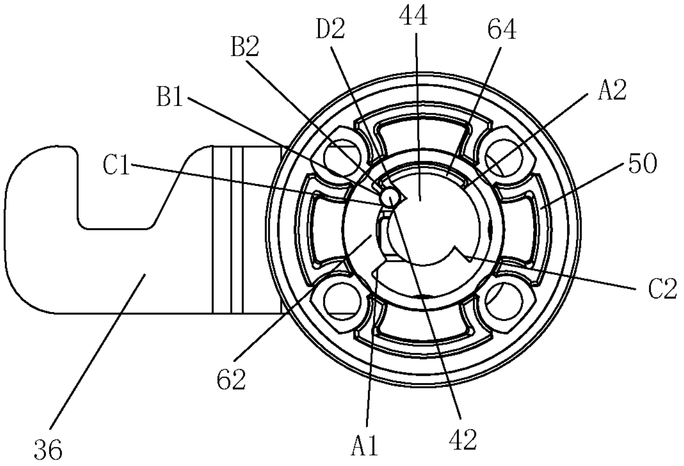
Figure 9F:
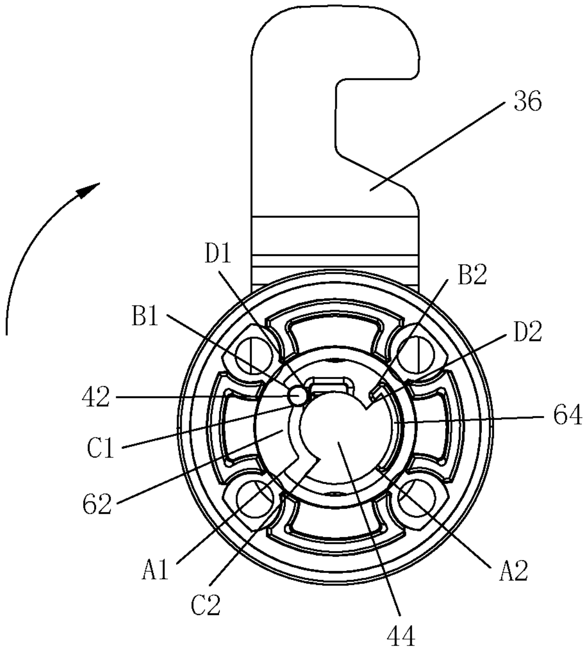

For the lock 100 of the present application, it can achieve counterclockwise rotation for unlocking and clockwise rotation for locking by slightly adjusting its initial state, specifically:

In the unlocked state, as shown in FIG. 9*e*, the first clutch mechanism 40 is in an engaged state, but is adjusted to make the second drive surface D1 of the first driving portion 42 abut the second clutch face D2 of the first clutch portion 44; and the second clutch mechanism 60 is in an engaged state, but is adjusted to make the fourth drive surface B1 of the second driving portion 62 abut the fourth clutch face B2 of the second clutch portion 64. The subsequent locking and unlocking process is similar to the above embodiment. As shown in FIG. 9*f*, keyless locking is achieved by the abutment of the fourth driving face B1 and the fourth clutch face B2 of the second clutch mechanism 60, and the engaged state of the first clutch mechanism 40 is switched to the contact of the first driving face C1 and the first clutch face C2 when the lock 100 is unlocked by the key, which will not be further described here.

In this embodiment, the tailpiece unit 34 includes a tailpiece 341 and a first transmission member 343. The first transmission member 343 in whole is column-shaped, with a first connecting hole 345 and a second connecting hole 347 defined at two ends thereof, respectively. The first connecting hole 345 is configured for connecting the tailpiece 341, and the second connecting hole 347 is configured for connecting the locking member 36. Specifically, one end of the first transmission member 343 with the second connecting hole 347 extends beyond the lock housing 10, and the locking member 36 is detachably connected to the second connecting hole 347 through screws, rivets, etc. One end of the tailpiece 341 is inserted into the first connecting hole 345, and a clearance fit or an interference fit may be formed therebetween. In some embodiments, the tailpiece 341 and the first transmission member 343 may also be an integrated structure. Another end of the tailpiece 341 forms the first clutch portion 44, which abuts an end face of the cylinder core 32. The second clutch portion 64 is provided on an end face of the first transmission portion 343 facing towards the cylinder core 32, and extends integrally and outwardly from the first transmission portion 343 along the axial direction. In other embodiments, the second clutch portion 64 may also be formed separately and then assembled to the first transmission portion 343.

Figure 10A:
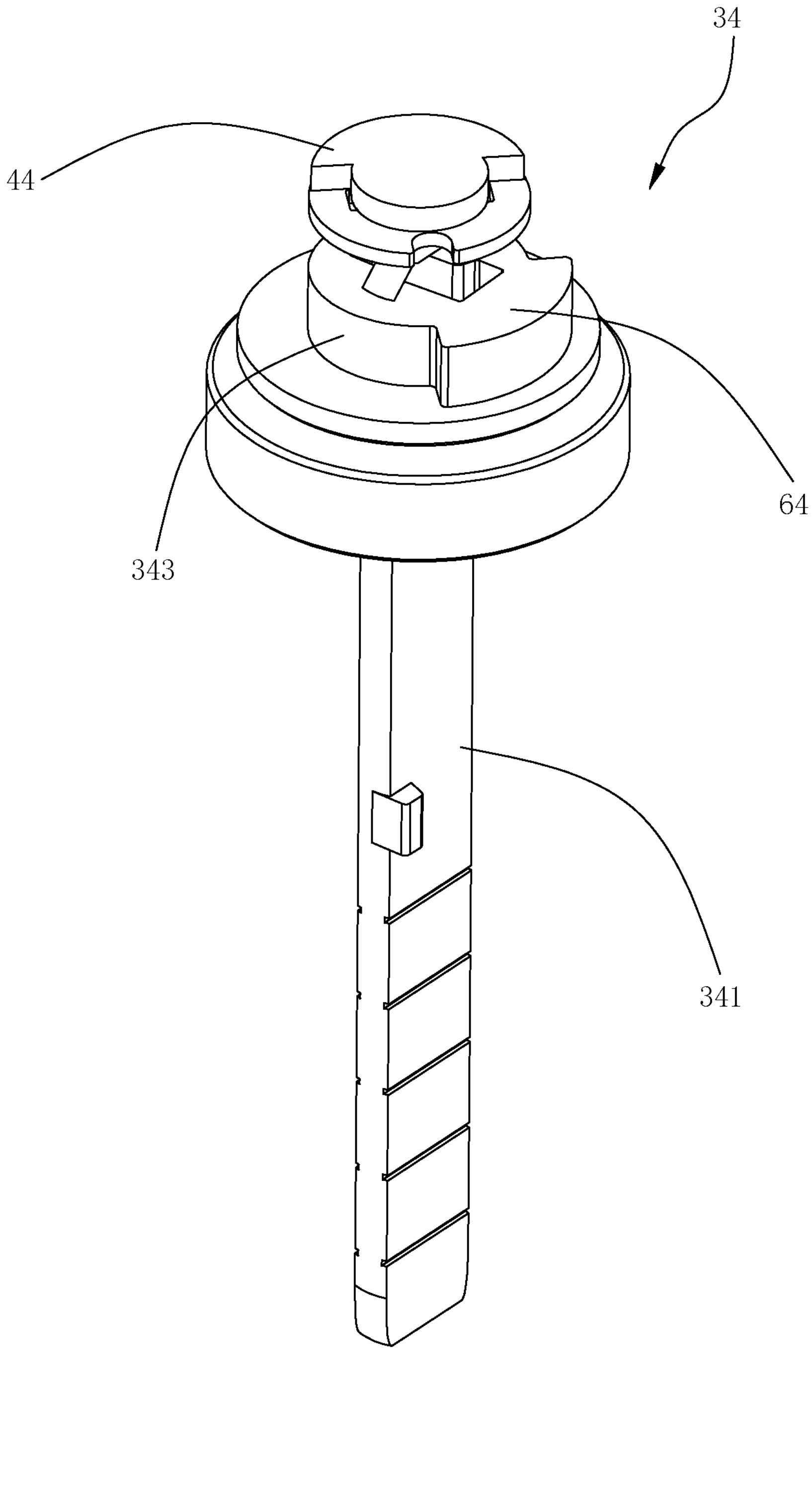

In another embodiment shown in FIG. 10 and FIG. 10*a*, the tailpiece unit 34 includes a tailpiece 341 and a first transmission member 343 connected to the tailpiece 341. The first clutch portion 44 is provided on the tailpiece 341, and the second clutch portion 64 is provided on the first transmission member 343. The difference is that one end of the tailpiece 341 extends outwardly through the first transmission member 343 and the lock housing 10, and is connected to a locking bolt, a locking body and the like through a transmission mechanism.

In this embodiment, the operating member 52 includes a knob 521 and a second transmission member 523. The knob 521 is cylindrical-shaped with an open end and a closed end. The cylinder shell 56 and cylinder core 32 are arranged a the central portion of the knob 521, and the through hole 529 is defined in the closed end of the knob 521 at a position corresponding to the keyway 321 of the cylinder core 32. A plurality of connecting poles 525 extends from the closed end of the knob 521 towards the open end, and a plurality of fixing holes 527 is defined in the second transmission member 523 correspondingly. Fixing components, such as screws extend through the fixing holes 527 and then are fixed into the connecting pole 525 threadedly, thereby connecting the second transmission member 523 to the knob 521. In some embodiments, the second transmission member 523 and the knob 521 may also be formed integrally.

In this embodiment, the cylinder shell 56 is formed separately and then assembled into the knob 521, specifically assembled into a space surrounded by the connecting poles 525. Preferably, the cylinder shell 56 protrudes a latching portion 58 into a space between two neighboring connecting poles 525, so as to form a position limit in a circumferential direction for the cylinder shell 56 and the knob 521, thereby the cylinder shell 56 and the knob 521 being capable of rotating synchronously after being assembled. In some embodiments, the cylinder shell 56 and knob 521 may also be formed integrally.

As shown in FIG. 5, the lock housing 10 includes a mounting seat 12 and a sleeve 14 extending outwardly from a central portion of the mounting seat 12 in a direction away from the operating member 52. The knob 521 is mounted around the mounting seat 12, the second transmission member 523 is arranged in the mounting seat 12, the reset member 54 is mounted around the second transmission member 523, and the position portions 59 are provided on the second transmission member 523 and the mounting seat 12, respectively. In this embodiment, as shown in FIG. 4 and FIG. 6, a step 121 is provided on an inner wall surface of an end of the mounting seat 12 facing towards the knob 521 for providing a position limit to the second transmission member 523 in the axial direction, so that the second transmission member 523 cannot be detached from the lock housing 10, and in turn the whole operating member 52 cannot be detached from the lock housing 10. Preferably, a bearing 16 is provided between the mounting seat 12 and the second transmission member 523 to reduce a friction therebetween during relative rotation. Preferably, a wear-resistant gasket 18 is provided between the step 121 of the mounting seat 12 and the second transmission member 523, further reducing wear.

The first transmission member 343 is arranged in the sleeve 14 with two ends thereof extending beyond the sleeve 14. The tailpiece unit 34 extends through the second transmission member 523 to connect the first transmission member 343. The second transmission member 523 surrounds a corresponding end of the first transmission member 343 and protrudes radially and inwardly to form the second driving component 62, which cooperates with the second clutch component 64. In some embodiments, the second driving portion 62 may also extend axially and outwardly from the second transmission member 523; the second clutch portion 64 may also extend radially and outwardly from the first transmission member 343; or, the second driving portion 62 and the second clutch portion 64 both extend axially or radially. As long as the second driving portion 62 and the second clutch portion 64 are located on the same ring, contact and separation of them may be achieved by relative rotation, allowing the second clutch mechanism 60 to switch between the disengaged state and the engaged state.

Preferably, threads 19 are provided on an outer circumferential surface of the sleeve 14, and the lock 100 can be installed on the first object 210, such as a door or window, by screwing.

The lock 100 of the present application can achieve key locking and keyless locking by means of the first clutch mechanism 40 and the second clutch mechanism 60, making it more convenient to use. Moreover, by means of adjusting the initial state of the second clutch mechanism 60, the lock 100 can be set to rotate counterclockwise to lock or clockwise to lock, which allows that the lock 100 of the present application can be installed on the first object 210 and operate normally without the need for component replacement, regardless of whether the first object 210 is rotated left or right to open. Correspondingly, the locking member 36 may have two states too. As shown in the drawings, the locking member 36 is hook-liked, and its hook orientation may be left or right, which can be achieved by flipping the locking member 36, thereby matching with two usage states of left open and right open, respectively. The lock 100 in whole is simple in structure, easy to operate, and has good universality.

Referring to FIG. 11, in an optional embodiment, the lock 100 may further include a locking body 80, which may be driven, for example by the tailpiece 341. In this situation, the tailpiece 341 may be a rod-shaped structure, with one end thereof being connected to a driving connecting part 82 of the locking body 80. The lock 100 is arranged on the first object 210, driving a locking member 84 of the locking body 80 to move for locking. In this embodiment, the locking member 84 is a dead bolt, which means that the locking member does not include an inclined surface for a latch bolt. For locking or unlocking the lock with the dead bolt, a control component of the lock must be operated to control the extension or retraction of the dead bolt. Compared to this, in case of with a latch bolt, it is generally only necessary to make an object abut and push the inclined surface of the latch bolt along a direction perpendicular to an extension of the latch bolt to push the latch bolt back. Therefore, compared to the latch bolt, the safety of the dead bolt is higher.

Referring to FIG. 12, in an optional embodiment, the lock 100 includes a lock housing a cylinder assembly 30 arranged in the lock housing 10, an locking keyless assembly 50 connected to the cylinder assembly 30 in a transmission way and a locking body 80. The locking keyless assembly 50 includes a first operating member 52 and a second knob 88, the first operating member 52 and the cylinder assembly 30 are arranged on one side of the first object 110, and the second knob 88 is arranged on the other side of the first object 110 through a fixing seat 86. The tailpiece 341 extends through the driving connecting part 82 of the locking body and is connected to the driving connecting part 82 in a transmission way. In this embodiment, the tailpiece 341 has a trapezoidal-shaped cross section, and the driving connecting part 82 is formed as a trapezoidal-shaped hole that generally corresponds to the trapezoidal-shaped cross section, so that the rotation of the tailpiece 341 can be transmitted to the locking body 80 through its matching shape with the driving connecting portion 82.

In this embodiment, the driving connecting portion 82 of the locking body 80 has another setting state. In the setting state, the driving connecting portion 82 is rotated 180°. At this time, only the tailpiece 341 and the first transmission member 343 need to be rotated 180° and then installed. For the rotation of the first transmission member 343, an additional adjusting rod may further be provided for auxiliary installation. The adjusting rod has an adjustment end that matches a shape of a receiving port of the first transmission member 343 and a rod thinner than the adjustment end, so that the adjustment end can pass through the driving connecting portion 82 of the locking body 80 and rotate, and the thinner rod will not have a transmission connection with the driving connecting portion 82. As a result, the adjusting rod can rotate the first transmission member 343 to adjust it to a desired setting state.

Similar to the above embodiments, locks with the additional setting state can be installed on the first object that opens left or right without the need to replace components of the lock. It can be understood that in order to clearly distinguish two setting states, the first transmission portion 343, the driving connecting portion 82 and the locking member 84 may all be provided with markings to distinguish the two installation states, thereby preventing wrong installation.

During installing, firstly the lock housing 10, the first transmission member 343, the tailpiece unit 31, the reset member 54, the second transmission member 523, the cylinder core 32 and the first operating member 52 are assembled in sequence, and then installed on one side of the first object 210 to be locked. The locking body 80 is inserted inside the first object 210 to be locked, wherein the locking member 84 of the locking body 80 can extend or retract relative to the first object 210. Then, the tailpiece 341 is inserted and passed through the driving connecting portion 82 of the locking body 80, so that the tailpiece 341 passes through the locking body 80 and is connected to the first transmission member 343. In this step, if it is necessary to adjust the setting state of the first transmission member 343, the adjusting rod may be used to adjust the first transmission member 343. After inserting the tailpiece 341 into position, the fixing seat 86 and the second knob 88 can be sequentially installed on the other side of the first object 210. The second knob 88 includes a receiving port for receiving the tailpiece 341, which forms a transmission fit with the tailpiece 341, thereby enabling the second knob 88 to control the locking and unlocking of the lock. In this embodiment, the locking member 84 of the locking body 80 is a dead bolt.

It should be noted that the above embodiments are preferred embodiments of the present application, and their description is more specific and detailed, but cannot be understood as a limitation of the present application. It should be pointed out that for those ordinary skilled in the art, without departing from the concept of the present application, modifications and improvements may be made, such as combining different features in various embodiments, which should fall within the scope of the present application.

What is claimed is:

1. A lock, comprising a lock housing, a cylinder assembly being rotatably arranged in the lock housing and a locking keyless assembly being connected to the cylinder assembly in a in transmission way, the cylinder assembly comprising a cylinder core and a tailpiece unit, a first clutch mechanism being provided between the cylinder core and the tailpiece unit, and a second clutch mechanism being provided between the locking keyless assembly and the tailpiece unit, when the second clutch mechanism is in an engaged state, the locking keyless assembly being movable relative to the lock housing in a first direction under a driving of an external force for locking, the cylinder core and the tailpiece unit rotating along with the locking keyless assembly synchronously;

when the external force acting on the locking keyless assembly is withdrawn, the locking keyless assembly moving in a second direction opposite to the first direction, so that the second clutch mechanism switches to a disengaged state.

2. The lock according to claim 1, wherein the first clutch mechanism and the second clutch mechanism both are in the engaged state when the lock is in an unlocked state.

3. The lock according to claim 1, wherein the locking keyless assembly comprises an operating member and a reset member, moving of the locking keyless assembly relative to the lock housing in the first direction under the driving of the external force is a rotation of the operating member in a clockwise direction or a counterclockwise direction, and the reset member generating deformation during this rotation;

moving of the locking keyless assembly in the second direction when the external force acting on the locking keyless assembly is withdrawn is a rotation of the operating member in the second direction under the driving of the reset member that restores deformation.

4. The lock according to claim 3, wherein the cylinder core is arranged in the operating member, rotating of the locking keyless assembly in the second direction under the driving of the reset member that restores deformation when the external force acting on the locking keyless assembly is withdrawn drives the cylinder core to move relative to the tailpiece unit, thereby the first clutch mechanism switching to a disengaged state.

5. The lock according to claim 4, further comprising a key, wherein the cylinder core defines a keyway for inserting of the key, and the cylinder core is capable of rotating in the operating member under the driving of the key, the key driving the cylinder core to rotate a first angle in the second direction relative to the tailpiece unit after the lock is locked by the locking keyless assembly, thereby the first clutch mechanism switching to the engaged state;

the key driving the cylinder core to rotate a second angle continuously in the second direction to drive the tailpiece unit to rotate along therewith in the second direction to unlock, thereby the operating member and the tailpiece unit generating relative rotation, and the second clutch mechanism switching to the engaged state.

6. The lock according to claim 5, wherein the first clutch mechanism comprises a first driving member and a first clutch member, and the first clutch member comprises a first clutch face and a second clutch face being spaced from each other; the first driving member is located between the first clutch face and the second clutch face, and comprises a first driving face facing the first clutch face and a second driving face facing the second clutch face, the first driving face abutting the first clutch face when the lock is in the unlocked state;

the second driving face abutting the second clutch face when the key drives the cylinder core to unlock and the cylinder core rotates the first angle in the second direction.

7. The lock according to claim 6, wherein the key drives the cylinder core to rotate in the first direction until the first driving face abutting the first clutch face again after the key drives the cylinder core to unlock, thereby the key being capable of being taken off.

8. The lock according to claim 7, wherein the first angle is 90 degrees, the second angle is 90 degrees, and the key is capable of being taken off after rotating 180 degrees in the first direction after the key drives the cylinder core to unlock.

9. The lock according to claim 1, wherein the tailpiece unit rotates 180 degrees in the first direction when the lock in the unlocked state to make the lock be switched so that the locking keyless assembly is capable of moving relative to the lock housing in the second direction under the driving of the external force drive to lock.

10. The lock according to claim 6, wherein the second clutch mechanism comprises a second driving portion and a second clutch portion, a third driving face and a fourth driving face are provided on two opposite sides of the second driving portion, respectively, and a third clutch face and a fourth clutch face are provided on two opposite sides of the second clutch portion, respectively;

the third driving face abutting the third clutch face or the fourth driving face abutting the fourth clutch face when the second clutch mechanism is in the engaged state.

11. The lock according to claim 10, wherein the second driving portion and the second clutch portion are arc-shaped blocks and located on a same ring, a central angle corresponding to the second driving portion is 90 degrees, and a central angle corresponding to the second clutch portion is 90 degrees.

12. The lock according to claim 11, wherein when the second clutch mechanism is in the disengaged state, a central angle corresponding to a space between the third driving face and the third clutch face is 90 degrees and a central angle corresponding to a space between the fourth driving face and the fourth clutch face is 90 degrees.

13. The lock according to claim 10, wherein the tailpiece unit comprises a tailpiece and a first transmission member connected to the tailpiece by plugging, a first clutch portion is provided on the tailpiece, and the second clutch portion is provided on the first transmission member.

14. The lock according to claim 13, wherein one end of the tailpiece is provided with the first clutch portion, and another end of the tailpiece extends outwardly through the first transmission member and the lock housing; or, one end of the first transmission member is connected to the tailpiece of the tailpiece unit by plugging, and another end of the first transmission member extends out of the lock housing.

15. The lock according to claim 13, wherein the operating member comprises a knob mounted around the lock housing and a second transmission member connected to the knob, the second transmission member is arranged around the first transmission member, the cylinder core is arranged in the knob, and the second driving portion is arranged on the second transmission member.

16. The lock according to claim 15, wherein the second transmission member is rotatably arranged in the lock housing, and a bearing is provided between the lock housing and the second transmission member.

17. The lock according to claim 15, wherein the second transmission member is rotatably arranged in the lock housing, and a step is provided at an end of the lock housing facing towards the knob to limit a position of the second transmission member.

18. The lock according to claim 14, further comprising a locking body, which is driven by the tailpiece to achieve locking of the lock.

19. The lock according to claim 18, further comprising a second knob, wherein the tailpiece extends through the locking body with one end thereof connected to the second knob in a transmission way and another end thereof connected to the first transmission member in a transmission way, thereby rotating the second knob being capable of driving the locking body to lock or unlock.

20. A locking device comprising a first object and a second object, wherein the first object is provided with the lock defined in claim 1, the lock is locked with the second object when it is in a locked state and separated from the second object when it is in an unlocked state.

* * * * *